United States Patent
Han et al.

(10) Patent No.: US 9,681,128 B1
(45) Date of Patent: Jun. 13, 2017

(54) ADAPTIVE PRE-TRANSFORM SCANNING PATTERNS FOR VIDEO AND IMAGE COMPRESSION

(71) Applicant: Google Inc., Mountain View, CA (US)

(72) Inventors: Jingning Han, Stanford, CA (US); Debargha Mukherjee, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 417 days.

(21) Appl. No.: 13/755,108

(22) Filed: Jan. 31, 2013

(51) Int. Cl.
*H04N 19/50* (2014.01)

(52) U.S. Cl.
CPC .............................. *H04N 19/00569* (2013.01)

(58) Field of Classification Search
CPC .............................. H04N 19/70; H04N 19/176
See application file for complete search history.

(56) References Cited

U.S. PATENT DOCUMENTS

| | | | |
|---|---|---|---|
| 5,452,104 A | 9/1995 | Lee | |
| 6,108,383 A | 8/2000 | Miller et al. | |
| 6,243,416 B1 | 6/2001 | Matsushiro et al. | |
| 6,256,423 B1 | 7/2001 | Krishnamurthy et al. | |
| 6,434,197 B1 | 8/2002 | Wang et al. | |
| 6,473,460 B1 | 10/2002 | Topper | |
| 6,532,306 B1 | 3/2003 | Boon et al. | |
| 6,687,304 B1 | 2/2004 | Peng | |
| 7,116,830 B2 | 10/2006 | Srinivasan | |
| 7,218,674 B2 | 5/2007 | Kuo | |
| 7,236,527 B2 | 6/2007 | Ohira | |
| 7,253,831 B2 | 8/2007 | Gu | |
| 7,263,125 B2 | 8/2007 | Lainema | |
| 7,450,642 B2 | 11/2008 | Youn | |
| 7,457,362 B2 | 11/2008 | Sankaran | |
| 8,000,546 B2 | 8/2011 | Yang et al. | |
| 8,208,545 B2 | 6/2012 | Seo et al. | |

(Continued)

FOREIGN PATENT DOCUMENTS

| EP | 0836328 | 4/1998 |
|---|---|---|
| KR | 20080099835 A | 11/2008 |

(Continued)

OTHER PUBLICATIONS

Han et al., "Jointly Optimized Spatial Prediction and Block Transform for Video and Image Coding," IEEE Transactions on Image Processing, vol. 21, No. 4 (Apr. 2012).

(Continued)

*Primary Examiner* — William C Vaughn, Jr.
*Assistant Examiner* — Jerry Jean Baptiste
(74) *Attorney, Agent, or Firm* — Young Basile Hanlon & MacFarlane, P.C.

(57) ABSTRACT

Blocks of a frame of a video stream can be encoded using directional intra prediction modes followed by transforming the residual blocks. Coding efficiency can be improved by re-aligning pixels of a residual block before transformation to align the pixels of the block with the direction in which the prediction block for the original block was formed. Such an alignment can reduce the number of bits to be included in an encoded bitstream while maintaining the visual quality of the video stream by reducing the amount of structure or texture in the residual block that is not aligned with a horizontal or vertical axis.

20 Claims, 8 Drawing Sheets

(56) References Cited

U.S. PATENT DOCUMENTS

| | | | |
|---|---|---|---|
| 8,311,111 B2 | 11/2012 | Xu et al. | |
| 8,325,796 B2 | 12/2012 | Wilkins et al. | |
| 8,369,411 B2 | 2/2013 | Au et al. | |
| 8,406,545 B2 | 3/2013 | Choi et al. | |
| 8,526,498 B2 | 9/2013 | Lim et al. | |
| 8,666,181 B2 | 3/2014 | Venkatapuram et al. | |
| 8,711,935 B2 | 4/2014 | Kim et al. | |
| 8,724,702 B1 | 5/2014 | Bulusu et al. | |
| 8,929,440 B2 | 1/2015 | Nguyen et al. | |
| 2005/0265447 A1 | 12/2005 | Park | |
| 2007/0268964 A1 | 11/2007 | Zhao | |
| 2008/0260025 A1* | 10/2008 | Wada | H04N 19/176 375/240.03 |
| 2008/0310745 A1 | 12/2008 | Ye et al. | |
| 2009/0196342 A1 | 8/2009 | Divorra Escoda et al. | |
| 2009/0232211 A1 | 9/2009 | Chen et al. | |
| 2010/0086028 A1 | 4/2010 | Tanizawa et al. | |
| 2010/0118945 A1 | 5/2010 | Wada et al. | |
| 2010/0128796 A1 | 5/2010 | Choudhury | |
| 2010/0220790 A1* | 9/2010 | Jeon | H04N 19/55 375/240.16 |
| 2011/0085599 A1 | 4/2011 | Jeong et al. | |
| 2011/0176607 A1* | 7/2011 | Kim | H04N 19/593 375/240.08 |
| 2011/0235706 A1 | 9/2011 | Demircin et al. | |
| 2011/0243229 A1* | 10/2011 | Kim | H04N 19/176 375/240.13 |
| 2011/0293001 A1 | 12/2011 | Lim et al. | |
| 2012/0014436 A1 | 1/2012 | Segall et al. | |
| 2012/0014437 A1 | 1/2012 | Segall et al. | |
| 2012/0014438 A1 | 1/2012 | Segall et al. | |
| 2012/0014439 A1 | 1/2012 | Segall et al. | |
| 2012/0014440 A1 | 1/2012 | Segall et al. | |
| 2012/0014444 A1 | 1/2012 | Min et al. | |
| 2012/0057630 A1 | 3/2012 | Saxena et al. | |
| 2012/0082233 A1 | 4/2012 | Sze et al. | |
| 2012/0163457 A1 | 6/2012 | Wahadaniah et al. | |
| 2012/0201297 A1 | 8/2012 | Lim et al. | |
| 2012/0320975 A1 | 12/2012 | Kim et al. | |
| 2012/0320984 A1 | 12/2012 | Zhou | |
| 2013/0003837 A1 | 1/2013 | Yu et al. | |
| 2013/0003855 A1* | 1/2013 | Park | H04N 19/119 375/240.18 |
| 2013/0003857 A1 | 1/2013 | Yu et al. | |
| 2013/0089144 A1* | 4/2013 | Lee | H04N 19/593 375/240.12 |
| 2014/0092982 A1 | 4/2014 | Panusopone et al. | |

FOREIGN PATENT DOCUMENTS

| | | |
|---|---|---|
| WO | WO02104039 | 12/2002 |
| WO | WO2011150805 | 12/2011 |
| WO | WO2012122286 | 9/2012 |

OTHER PUBLICATIONS

Han et al., "Toward Jointly Optimal Spatial Prediction and Adaptive Transform in Video/Image Coding," ICASSP 2010 (Dallas, TX, Mar. 14-19, 2010).

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Adachi; "CAVLC Cleanup for ABT & Alternate Scan," Joint Collaborative Team on Video Coding, Geneva, Mar. 2011.

Bossen, F., "Common test Conditions and Software Reference Configurations, " Joint Collaborative Team on Video Coding, JCTVC-D600, Jan. 2011.

Bross, Benjamin et al.: "High Efficiency Video Coding (HEVC) text specification draft 8,"Joint Collaborative Team on Video Coding(JCT-VC) of ISO/IEC JTC1/SC29/WG11 and ITU-T SG16 WP3, document JCTVC-J1003_d7, 10th Meeting : Stockholm, SE, Jul. 11-20, 2012, all pages.

Davies, Thomas, "Unified scan processing for high efficiency coefficient coding," Joint Collaborative Team on Video Coding, Daegu, Jan. 2011.

ISR & Written Opinion, Re: Application # PCT/US2012/045075; Nov. 15, 2012.

ISR & Written Opinion, Re: Application #PCT/US2012/045048; Nov. 15, 2012.

ISR and Written Opinion in related matter PCT/US2013/063722, mailed Mar. 19, 2014.

ISR, & Written Opinion of the International Searching Authority for International Application No. ISR/US2013/058843 Nov. 22, 2013, 11 pages.

Karczewicz et al., "Modifications to intra blockes coefficient coding with VLC," Joint Collaborative Team on Video Coding, Torino, Jul. 2011.

Kerofsky et al., "Results of Core Experiment on Adaptive Block Transforms (ABT),"Video Coding Experts Group of ITU-T SG. 16; Eibsee, Germany; Jan. 2011.

Lee J H et al: "An Efficient Encoding of DCT Blocks With Block-Adaptive Scanning", IEICE Transactions on Communications, Communications Society, Tokyo, JP, vol. E-77-B, No. 12, Dec. 1, 1994, all pages.

(56) References Cited

OTHER PUBLICATIONS

Nguyen et al., "Improved Context Modeling for Coding Quantized Transform Coefficients in Video Compression," Picture Coding Symposium, Dec. 8, 2010.
Sole et al., "Non-CE11: Diagonal sub-block scan for HE residual coding," Joint Collaborative Team on Video Coding, Geneva, Mar. 2011.
Sole et al., "Unified scans for the significance map and coefficient level coding in high coding efficiency," Joint Collaborative Team on Video Coding, JCTVCF-288 Geneva, Jul. 8, 2011.
Sole, J., R. Joshi, and M. Karczewicz, "Unified scans for the significance map and coefficient level coding in high coding efficiency", JCTVC-E335, Joint Collaborative Team on Video Coding (JCT-VC) of ITU-T SG16 WP3 and ISO/IEC JTC1/SC29/WG11, Mar. 2011.
Song et al., "Mode dependent coefficient scan for inter blocks," JCTVC-F501, Joint Collaborative Team on Video Coding, Jul. 2011.
Sze et al., "CE11: Summary Report on coefficient scanning and coding," Joint Collaborative Team on Video Coding, Daegu, Jan. 2011.
Sze et al., "Parallelization of HHI_Transform_Coding, " Motion Picture Expert Group, Oct. 2010.
Wiegand T et al.: "WD3: Working Draft 3 of High-Efficiency Video Coding", 20110329, No. JCTVC-E603, Mar. 29, 2011, all pages.
Sze et al.; "CE11: Parallelization of HHI_Transform_Coding (Fixed Diagonal Scan from C227)", JCTVC-F129, Jul. 2011.
Wien et al., "H.26L Core Experiment Description for Adaptive Block Transforms", Video Coding Experts Group of ITU-T SG.16; Portland, Oregon; Aug. 2000.
Zheng, et al., Mode Dependent Coefficient Scanning, Joint Collaborative Team on Video Coding (JCT-VC) of ITU-T SG16 WP3 and ISO/IEC JTC1/SC29/WG11 4th Meeting: Daegu, KR, Jan. 18-20, 2011.
Office Action in a related matter. Korean Patent Application No. 10-2013-7034638, mailed May 11, 2015, listing new art.

* cited by examiner

ADAPTIVE PRE-TRANSFORM SCANNING PATTERNS FOR VIDEO AND IMAGE COMPRESSION

TECHNICAL FIELD

This disclosure relates to encoding and decoding visual data, such as video stream data, for transmission or storage.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Real-time video streaming, multi-point video conferencing or video broadcasting are examples of applications that employ video stream encoding including compression.

SUMMARY

Disclosed herein are aspects of systems, methods and apparatuses for encoding a video stream and decoding an encoded video bitstream while selectively realigning pixels of a residual block based on the prediction mode of the original block to be encoded. One method for encoding a video stream having a plurality of frames described herein includes identifying a prediction mode to be used to predict a first block of a frame of the plurality of frames, generating a prediction block using the prediction mode, generating a residual block as a difference between pixel values of the prediction block and the first block, and, if the prediction mode is a directional intra prediction mode, realigning pixels of the residual block based on a realignment mode conforming to the directional intra prediction mode to form a realigned block, transforming the realigned block using a transform mode to form a transformed realigned block, and encoding the transformed realigned block into an encoded video bitstream.

A method of decoding decoding a video bitstream having a plurality of frames according to another aspect of the teachings herein includes identifying a prediction mode that was used to predict a first block of a frame of the plurality of frames, generating a prediction block using the prediction mode, and inverse transforming a first encoded block from the video bitstream using a transform mode to form an inverse transformed block. The method also includes, if the prediction mode is a directional intra prediction mode, realigning pixels of the inverse transformed block based on a realignment mode conforming to the directional intra prediction mode to form a residual block, and adding pixels of the residual block to the prediction block to recreate the first block. Otherwise, that is, if the prediction mode is other than a directional intra prediction mode, pixels of the inverse transformed block are added to the prediction block to recreate the first block.

Another aspect of the teachings herein is an apparatus for encoding a video stream having a plurality of frames that includes a memory and a processor. In an implementation, the processor is configured to execute instructions stored in the memory to identify a prediction mode to be used to predict a first block of a frame of the plurality of frames, generate a prediction block using the prediction mode, generate a residual block as a difference between pixel values of the prediction block and the first block, and, if the prediction mode is a directional intra prediction mode, realign pixels of the residual block based on a realignment mode conforming to the directional intra prediction mode to form a realigned block, transform the realigned block using a transform mode to form a transformed realigned block, and encode the transformed realigned block into an encoded video bitstream.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. Encoding such digital video streams to produce encoded video bitstreams is often desirable. Encoding can include compressing the video stream to reduce required bandwidth. Compression techniques can include inter prediction, wherein a block of a frame of a video stream is predicted using another block shifted by a motion vector (e.g., from a temporally nearby frame) as a prediction block, or intra prediction, which the block is predicted using only some data from one or more nearby blocks to form a prediction block. In either case, the prediction block is used to generate differences between it and the block such that only the differences (also called a residual block or residual) need to be encoded in order to later recreate the block.

The encoding steps after generating the differences often include a transformation step. The transformation step may use a directional transform to efficiently compress the residual based on the type of prediction used. However, using a directional transform may be computationally-intensive in order to implement a large number of transform sizes. According to the teachings herein, choosing the best transform for a given residual signal may be achieved in a simple way by permuting residual pixels appropriately before performing the transformation step. First discussed below are environments in which aspects of this disclosure can be implemented, and then details of certain implementations are explained.

Figure 1:
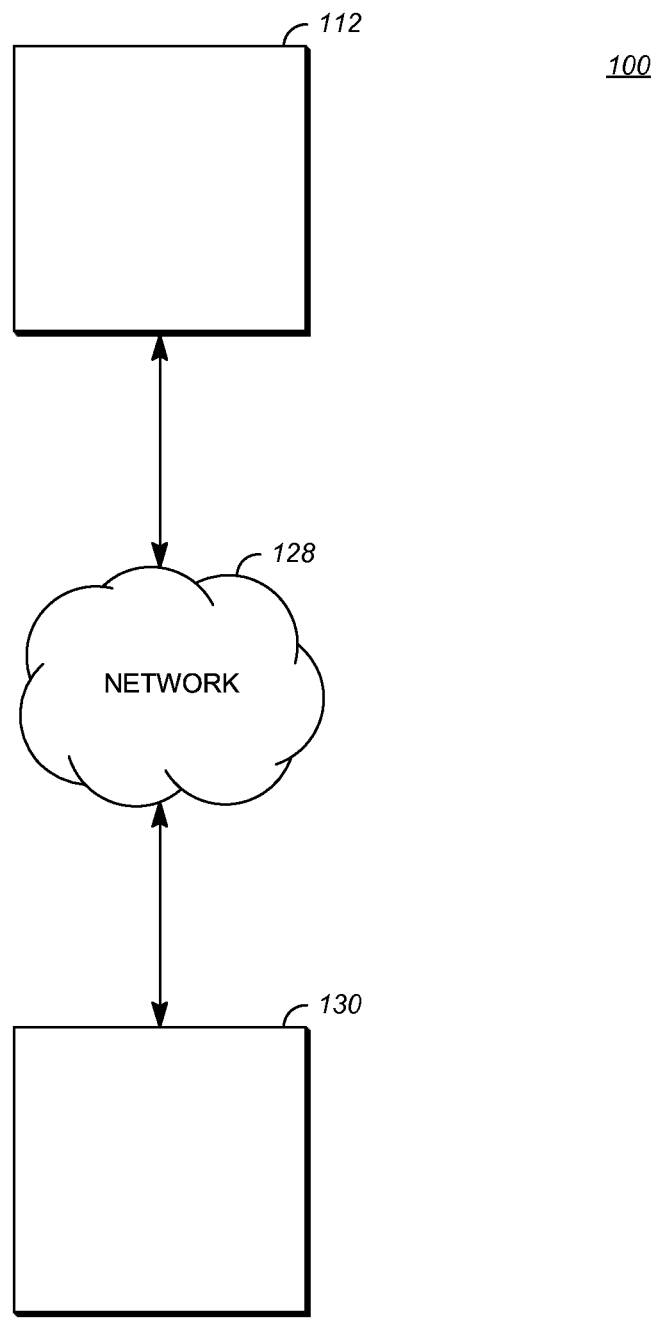
FIG. 1 is a schematic of a video encoding and decoding system.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect the transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
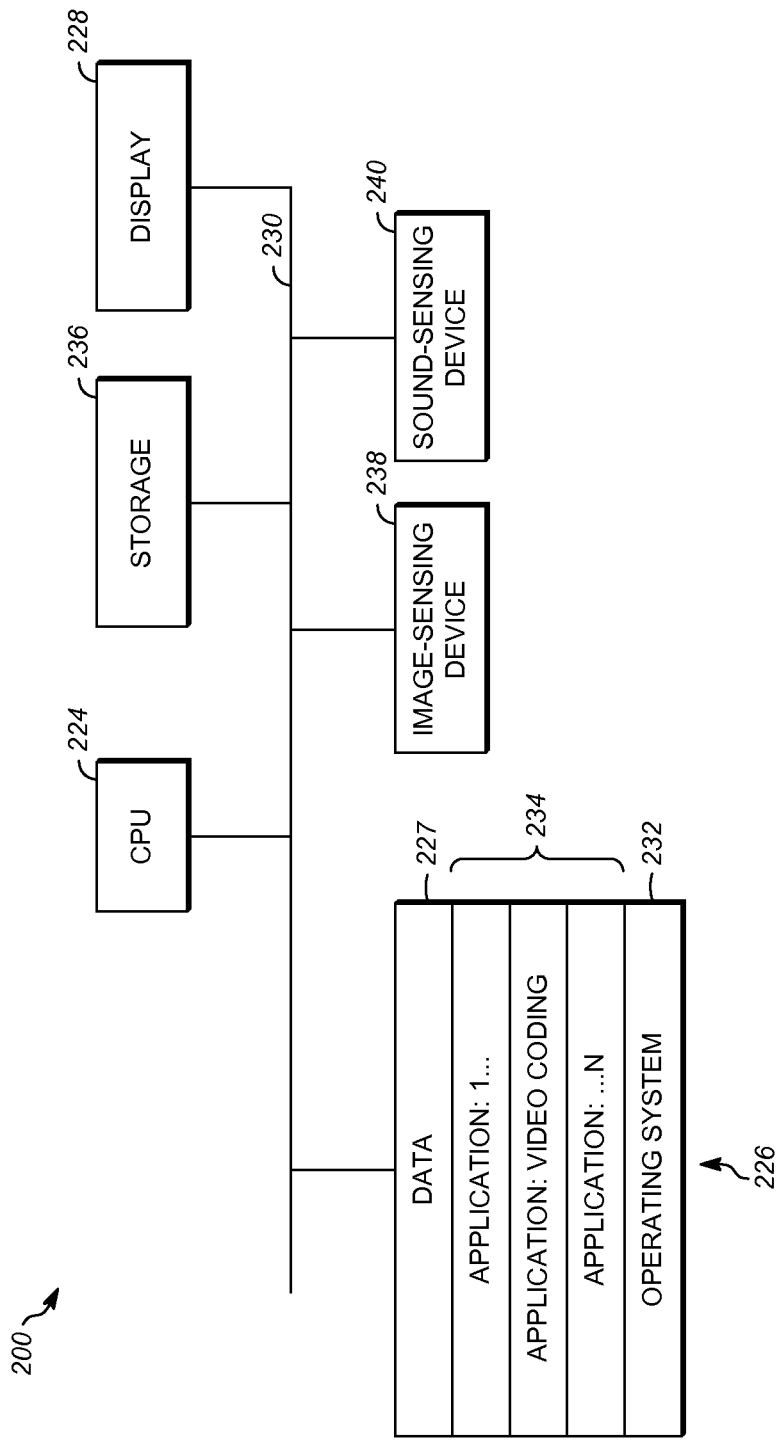
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
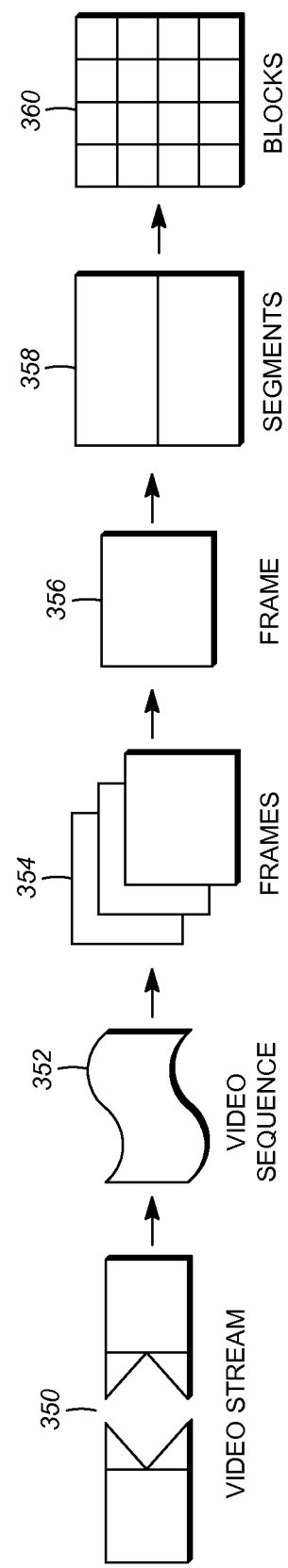
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, a single frame 356 can be divided into a series of segments or planes 358. Segments or planes 358 can be subsets of frames that permit parallel processing, for example. Segments or planes 358 can also be subsets of frames that can separate the video data into separate colors. For example, a frame 356 of color video data can include a luminance plane 358 and two chrominance planes 358. The planes 358 can be sampled at different resolutions.

The segments or planes 358 can include blocks 360, which can contain data corresponding to, for example, 16×16 arrays of pixels in frame 356. Blocks 360 can also be arranged to include data from one or more planes 356 of pixel data. For example, macroblocks can include pixel data from a luminance plane 356 and both chrominance planes 356. Blocks 360 can also be of any other suitable size such as 4×4, 8×8 16×8, 8×16, 16×16 or larger. Unless otherwise noted, the terms block and macroblock are used interchangeably herein.

Figure 4:
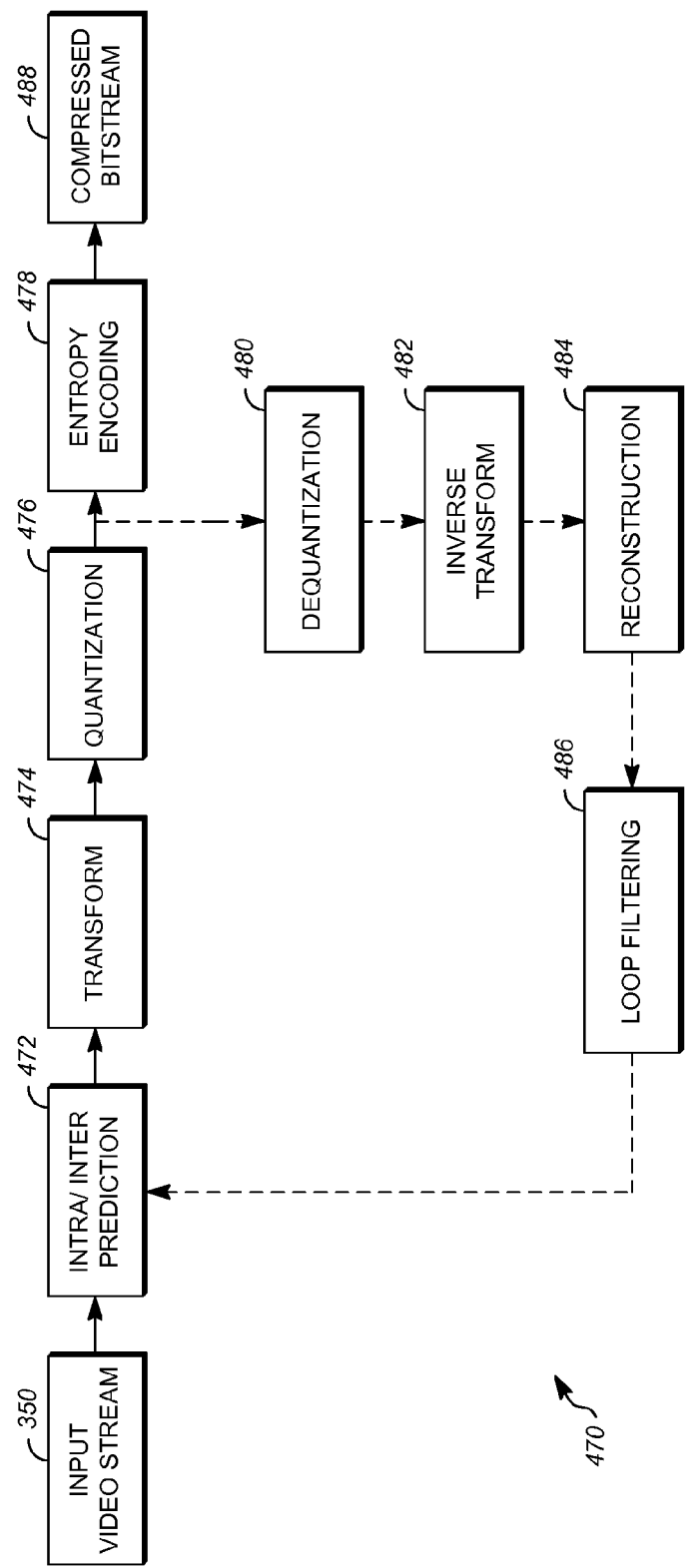
FIG. 4 is a block diagram of a video compression system in accordance with an implementation.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 can be processed in units of blocks. At the intra/inter prediction stage 472, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream or encoded video bitstream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474 for certain blocks or frames. In another implementation, an encoder 470 can have quantization stage 476 and dequantization stage 480 combined into a single stage.

Figure 5:
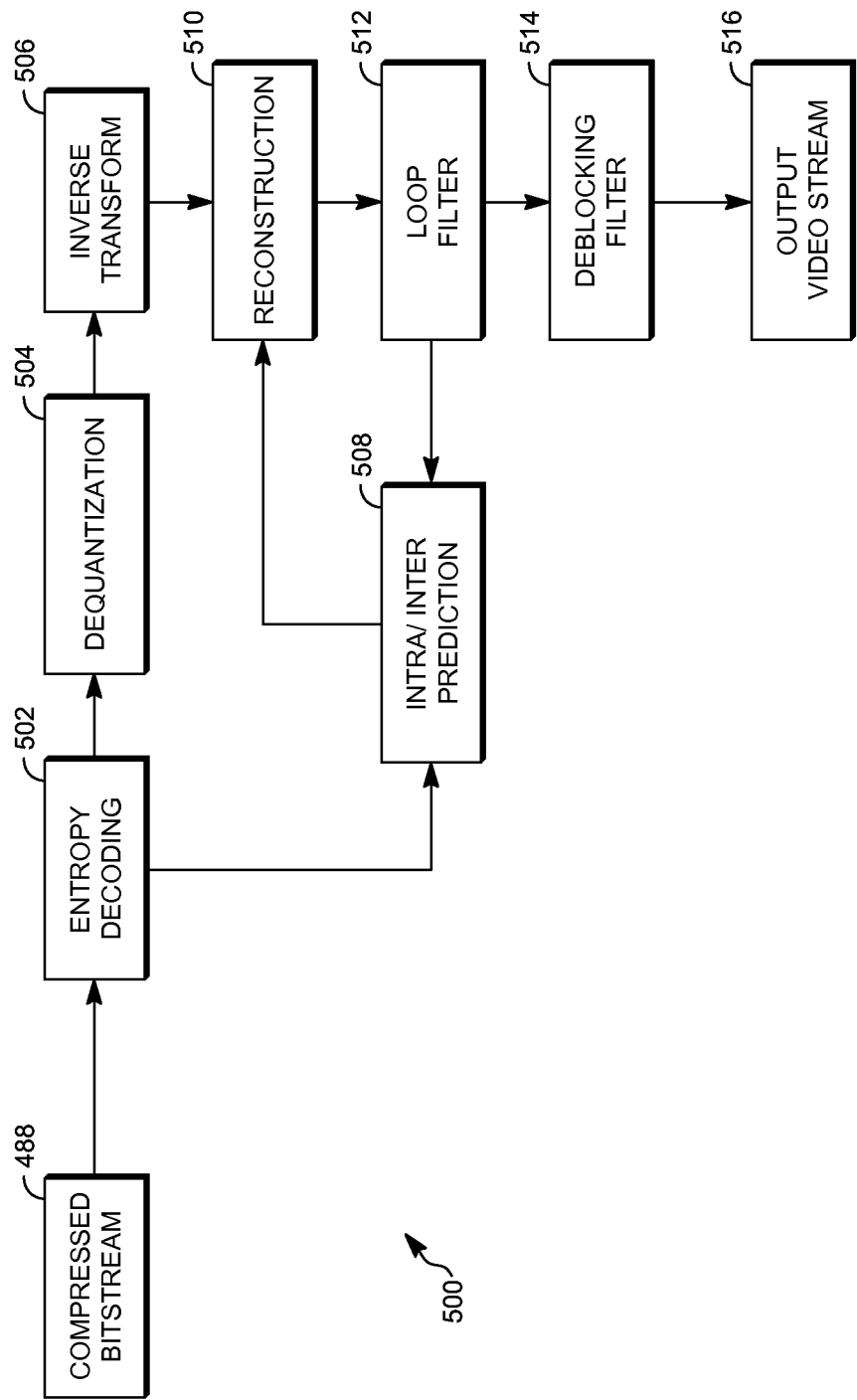
FIG. 5 is a block diagram of a video decompression system in accordance with another implementation.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 488. For example, decoder 500 can produce output video stream 516 without deblocking filtering stage 514.

Figure 6:
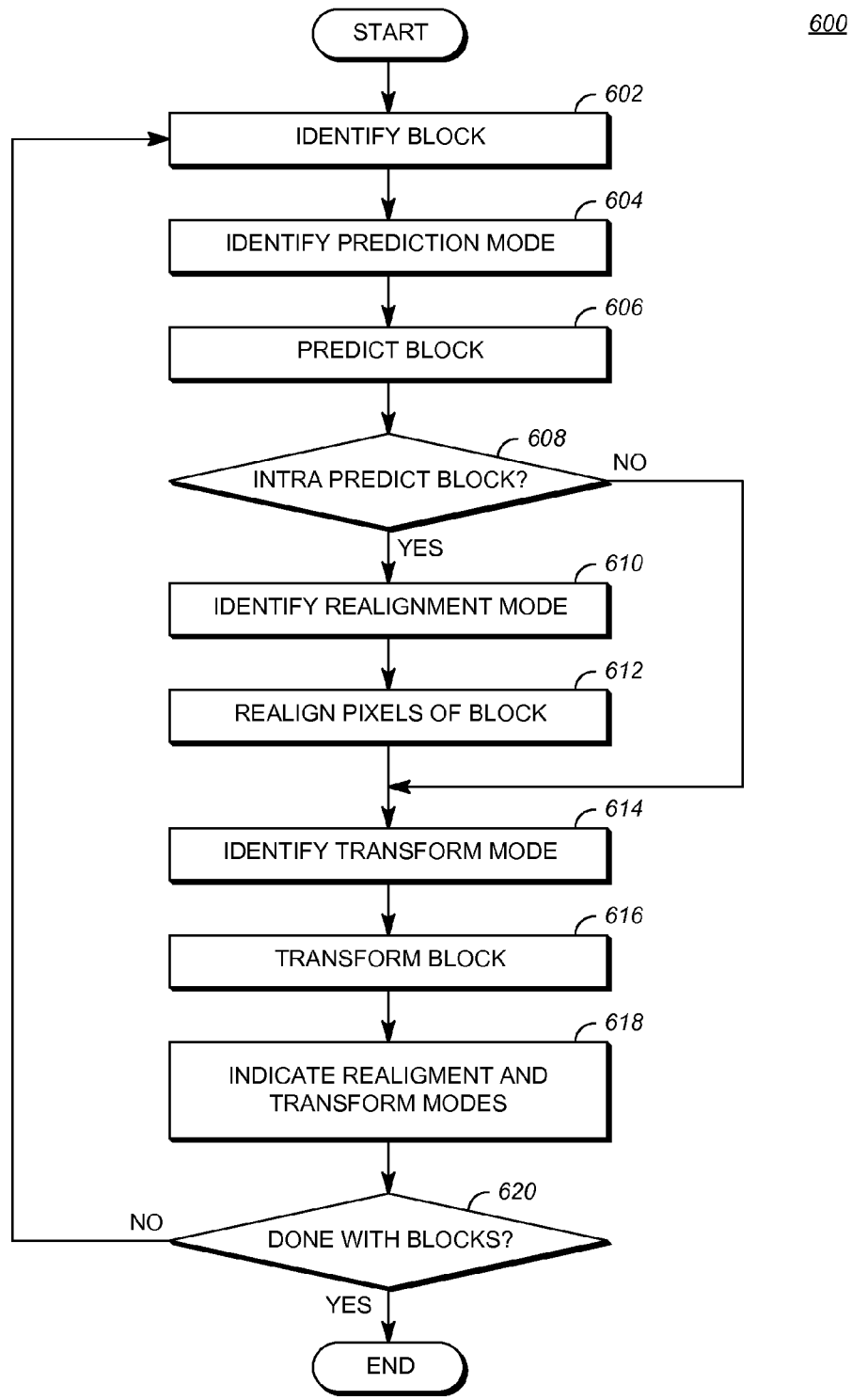
FIG. 6 is a flowchart of a process for encoding of a video stream using selectable transform sizes according to an aspect of the teachings herein.

FIG. 6 is a flowchart of a process 600 for encoding a video stream using re-aligned blocks according to an aspect of the teachings herein. Process 600 can be implemented in a system such as system 470 to encode a video stream using prediction and variable sized transforms. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a block of a plurality of blocks of a video stream is identified as part of a process that encodes a video stream. Process 600 identifies blocks of a frame of the video stream in a scan order. An example of a scan order is raster scan order, wherein the blocks of a frame are processed starting with a block at the upper left corner of the frame and proceeding in rows from left to right, starting with the top row and proceeding from the top row to the bottom row. At step 604, a prediction mode for the block is identified. The prediction mode can be identified as part of a rate distortion loop wherein the number of bits used to encode the predicted block along with the number of bits used to indicate the prediction mode in the encoded video bitstream (e.g., the rate) are compared to the pixel errors introduced by encoding (e.g., the distortion). Various intra prediction modes and an inter prediction mode may be available as discussed below. The prediction mode that optimizes the rate distortion value can be identified as the prediction mode to be used to predict the block. This block is also referred to as the current block.

At step 606, the current block is predicted. Predicting the block refers to generating a predictor block or predictor based on the prediction mode and generating the residual. For example, where the current block is prediction using intra prediction, the intra prediction mode indicates how nearby pixels in the same frame are used to block generate the prediction block. A vertical intra prediction mode typically generates a prediction block of the same size as the current block by duplicating the values for pixels located in an adjacent row (e.g., adjacent to the top row of the current block) into respective columns. A horizontal intra prediction mode typically generates a prediction block of the same size as the current block by duplicating the values for pixels located in an adjacent column adjacent (e.g., adjacent to the left columns of the current block) into respective rows. Various diagonal prediction modes are also possible that combine adjacent row and column pixel values as described in further detail below. Prediction can also include dividing the block into smaller sub-blocks for generating the predictor and the residual.

At step 608, process 600 determines whether the current block was predicted using intra prediction. If the current block was predicted instead using inter prediction, process 600 proceeds to step 614 to continue encoding the current block according to existing settings for transform mode such as transform size, quantization level and entropy coding. If process 600 instead determines that the current block has been predicted using intra prediction, process 600 identifies a realignment mode by advancing to step 610. The realignment mode identified can depend upon the intra prediction mode used to predict the block.

As mentioned briefly above, intra prediction generally forms prediction blocks by propagating pixels peripheral to the current block into a prediction block. The prediction block is then subtracted from the original block to form the residual. In modes that are sometimes referred to as V_PRED and H_PRED, pixel values are propagated vertically or horizontally from pixels immediately above the block or immediately to the left of the block, for example. In some cases, a single pixel value is calculated based on the peripheral pixels and all of the pixel locations in the prediction block are assigned the same single value. Modes known as DC_PRED and TM_PRED, for example, perform such calculations. Other modes propagate average pixel values into the predicted blocks. Such modes can use weighted average values of peripheral pixels and can propagate the weighted average pixels in generally diagonal directions into the prediction block (that is, in directions offset from both the horizontal and the vertical). These are called directional intra prediction modes herein. For example, directional intra prediction modes that may be called B_LD_PRED and B_RD_PRED propagate pixel values along 45 degree lines to the left and down and right and down (e.g., 225 degrees and 135 degrees), respectively. Directional intra prediction modes sometimes called B_VR_PRED, B_VL_PRED, B_HD_PRED and B_HU_PRED propagate pixel values along other lines through the block such as 22.5 degree lines through the block, etc.

Figure 8:
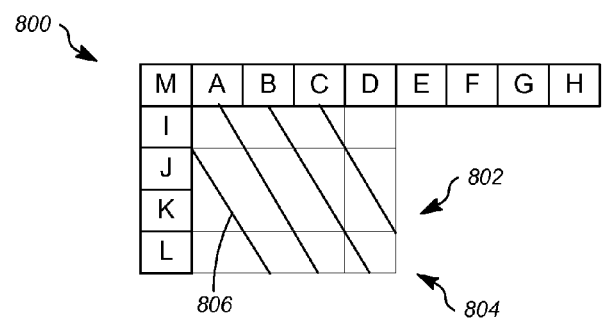
FIG. 8 is a diagram showing an example of an intra prediction mode.

FIG. 8 is a diagram showing an example of an intra prediction mode. Specifically, FIG. 8 illustrates use of the directional intra prediction mode B_VR_PRED. A 4×4 block of a frame 800 has peripheral pixels A through M 808 from blocks adjacent to the block that can be used to form a prediction block 802 according to the identified prediction mode. The prediction mode may be identified in a rate distortion loop that identifies a prediction mode resulting in an optimal rate distortion value, and adjacent pixels 808 may be propagated to form pixel values 804 for the prediction block 802 depending upon the mode. In FIG. 8, prediction mode B_VR_PRED is shown for example, where a linear combination (weighted average) of two or three of the peripheral pixels is generated and then pixel values 804 of the 4×4 prediction block 802 along lines extending through the block at 157.5 degrees, such as lines 806, are set to the value of the linear combination of peripheral pixels. For example, the pixel value 804 to be propagated along line 806 can be formed from a weighted average of pixel values I, J and K.

Returning now to FIG. 6, process 600, having identified which intra prediction mode was used to predict the block and then having identified a realignment mode corresponding to the prediction mode, re-aligns the pixels of the residual block based on the realignment mode in next step 612. For modes DC_PRED, TM_PRED, V_PRED, and H_PRED, the realignment mode may be a null mode that performs no re-alignment of residual values. For directional intra prediction modes, that is, modes such as modes B_LD_PRED, B_RD_PRED, B_VR_PRED, B_VL_PRED, B_HD_PRED and B_HU_PRED where pixels propagate offset from both the horizontal and diagonal, a realignment mode is a directional realignment mode that conforms to the prediction mode. That is, pixels may be re-aligned to adapt the succeeding transforms to the statistics of the residual block. Since the pixels of the prediction block can have a dominant pattern or texture in response to the propagation of pixel values along a particular direction, the residual block formed from subtracting the prediction block from the original data block can also have a dominant pattern or texture in the direction in which the block was predicted. By re-aligning the residual block to make this dominant pattern or texture in parallel with at least one direction in which the succeeding transform will be applied, the number of encoded bits to be included in the output video bitstream may be reduced. The directional realignment mode for the block thus rearranges the pixels located along a direction of the propagation into rows or columns as appropriate.

Figure 9:
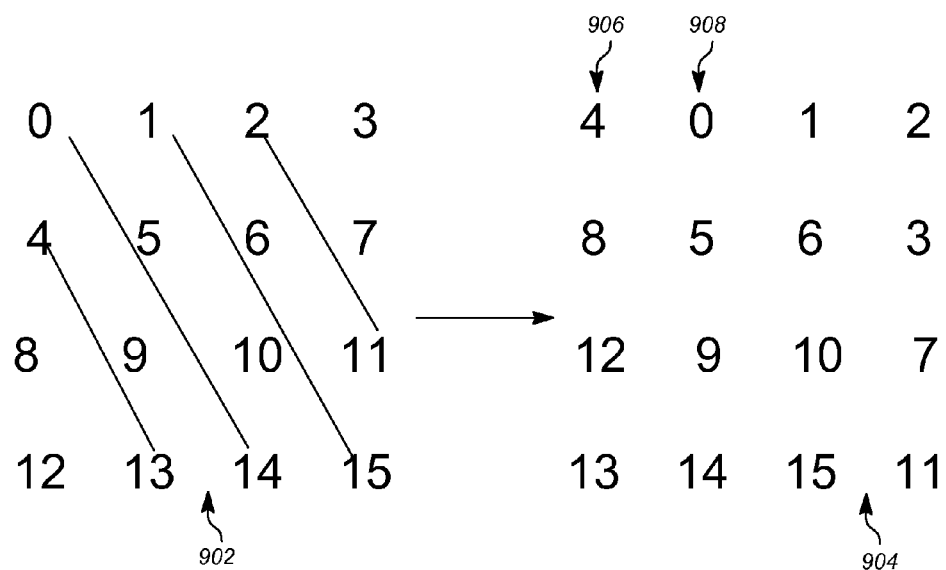
FIG. 9 is a diagram showing block re-alignment according to an aspect of the teachings herein.

FIG. 9 is a diagram showing block re-alignment according to an aspect of the teachings herein. More specifically, FIG. 9 shows an example of pixel realignment on a residual block resulting from prediction using the prediction mode shown in FIG. 8. The pixels 0-15 of a residual block 902 result from generating a predicted block (such as block 802) using the B_VR_PRED prediction mode and subtracting the predicted block from the current block. Because the original block was predicted using a diagonal prediction mode in this example, the block 902 can exhibit a dominant texture along the diagonal lines used to predict the block. This introduced texture can result in additional bits to be included in the encoded video bitstream because it can introduce structure into the pixel data that can result in non-zero co-efficients following transformation. Re-aligning the pixel data along the lines used to predict the block can reduce the number of bits included in the encoded video bitstream while maintaining the quality of the decoded video stream.

In this example, the resulting residual values of block 902 are re-aligned to form block 904. Pixels 4, 8, 12 and 13 are predicted using the same pixel value, namely a weighted average of pixels I, J and K from FIG. 8. Also in block 902, pixels 0, 5, 9 and 14 are predicted using weighted averages of pixels I, M and A from FIG. 8. Re-aligning block 902 to the arrangement of block 904 puts the pixels predicted using peripheral pixels I, J and K into left-most column 906 and pixels predicted using peripheral pixels I, M and A in column 908. Applying a 1D transform to the resulting columns, including columns 906 and 908 can encode the pixel information while encoding possible structure introduced by the prediction block into bits occupying the fewest locations in the transformed block. This can improve the efficiency with which entropy encoding can work to reduce the number of encoded bits included in the output video bitstream. As can be seen in FIG. 9, and more generally, for a given directional intra prediction mode, the corresponding realignment mode constructs the middle columns (or middle rows) for a realigned block by scanning pixels along the directional lines corresponding to the prediction mode, while the right- and left-most columns (or top- and bottom-most rows) are composed of the pixels sitting in the boundary of the original block.

Returning again to FIG. 6, residual blocks resulting from inter prediction can also be re-aligned to reduce the number of bits following transformation. In other words, steps 610 and 612 need not be skipped for inter predicted blocks. Texture in residual values resulting from inter prediction that may be reduced by re-aligning blocks could result from edges introduced by object motion, for example. Since this type of texture can be difficult to anticipate directly, techniques for selecting the realignment mode that provides the best bit savings include trying a plurality of possible realignment modes and comparing the results. This technique includes re-aligning the residual blocks followed by transforming the blocks using one or more transform modes and comparing the bit savings resulting from each combination of realignment and transform mode and selecting the realignment mode that results in the greatest bit savings (i.e., the lowest bit cost). The realignment mode used may be signaled with the block in the bitstream as described below. The possible realignment modes may include scanning the pixels in a residual block in various diagonal directions.

Returning again to FIG. 6, a transform mode is identified in step 614. The transform mode, including transform size, may be selected using any technique that would provide an efficient compression of the particular re-aligned block. A transform mode is generally selected based on the size of the predictor, the particular prediction mode, or other variables. It is often desirable to use a transform mode that aligns the resulting transform coefficients along an edge of the transformed block. The transform can be applied as a two-dimensional (2D) transform or as a series of one-dimensional (1D) transforms in a first direction followed by a series of 1D transforms applied in a second direction orthogonal to the first. The transforms can be the same type of transforms, for example DCT for the first series of 1D transforms and DCT for the second series of 1D transforms. Alternatively, the transforms can be different, for example an asymmetric discrete sine transform (ADST) for the first series of 1D transforms and DCT for the second series of 1D transforms, or vice versa. In other cases, the 1D transforms can be ADST in both directions. In cases where the pixels of the block are re-aligned along horizontal lines, such as accompany prediction modes B_HD_PRED and B_HU_PRED, a 1D transform can be applied to the horizontal rows of the block first.

In some implementations, a 1D transform can be applied to the rows or columns of the blocks with no second, orthogonal transform applied. In this example the 1D transforms sufficiently compact the bits that represent the transformed block into a small enough portion of the block to permit entropy encoding to efficiently encode the bitstream without applying a second transform.

After the transform mode is identified, the re-aligned residual block is transformed in step 616. At this time, or after the completion of the transform step for all blocks, the transformed blocks may be quantized and entropy coded to include in an encoded video bitstream.

At step 618, the prediction mode, realignment mode and transform mode used to encode the block can be indicated by including bits in the encoded video bitstream to indicate to a decoder which inverse transforms to use to decode the block and that the pixels need to be re-aligned following inverse transformation before performing prediction and reconstructing the original block. The prediction, realignment and transform modes can be indicated separately or, to save bits in the encoded video bitstream, the modes can be linked. For example, a prediction mode can be indicated in a block header included with the block in the video bitstream. The realignment mode and the transform mode can be implied by the prediction mode, so additional bits are not required to be included to identify these modes to a decoder. Including bits in the encoded video bitstream to independently identify a realignment mode and a transform mode can provide additional flexibility in combining modes at the expense of additional bits. In an implementation of these teachings, a predefined number of realignment modes and/or transform modes may be assigned an index value such that index values for one or both modes are included in the bitstream along with a separate correlation of each mode to the index value for the decoder to use in decoding the bitstream.

At step 620, process 600 checks to see if any more blocks of the frame remain to be processed. If blocks remain in the frame to be processed, process 600 branches to step 602 to identify the next block. Otherwise, process 600 exits.

As mentioned above, in an alternative implementation, residuals formed by inter prediction may also be processed using steps 610 and 612 by testing a number of different realignment modes combined with different transform modes and selecting, to re-align the residuals, that realignment mode that results in the lowest bit cost. In this implementation, identifying a transform mode in step 614 and transforming the block in step 616 are not separate steps, but are performed in this same rate distortion loop. In yet another alternative implementation, these modified steps are performed for all residuals including all intra predicted residuals. That is, instead of selecting a realignment mode for intra predicted blocks based solely on the intra prediction mode, a number of possible realignment modes (and transform modes) may be tested in a rate distortion loop to determine the modes for a block resulting in the lowest rate distortion value. This alternative processing could be useful to limit the number of possible modes tested and subsequently transmitted within the bitstream, particularly where both inter and intra predicted blocks are subject to r-ealignment.

Figure 7:
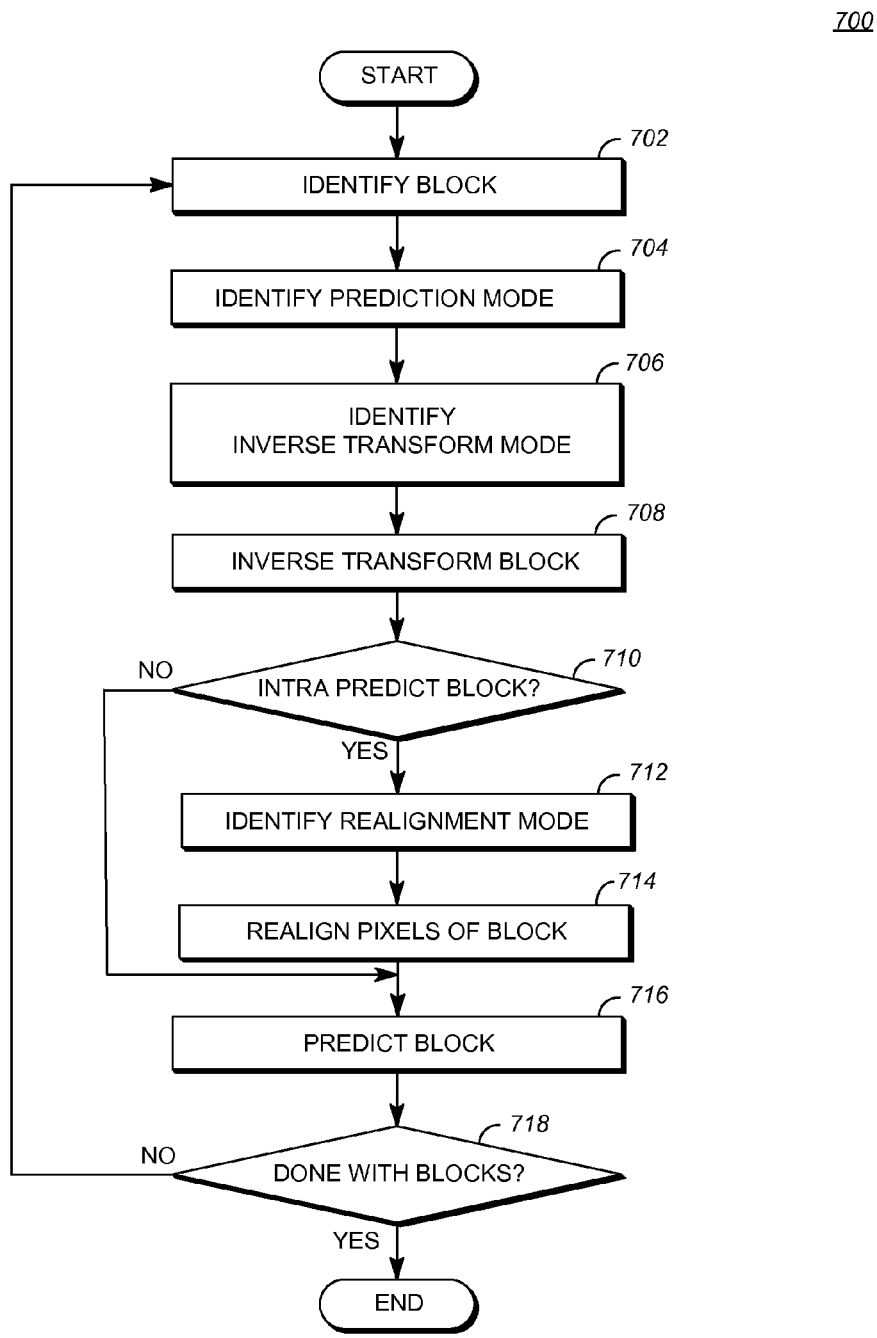
FIG. 7 is a flowchart of a process for decoding of a video stream using selectable transform sizes according to an aspect of the teachings herein.

FIG. 7 is a flowchart of a process 700 for decoding a video stream using re-aligned blocks according to an aspect of the teachings herein. Process 700 can be implemented in a system such as system 500 to decode a video stream encoded using the techniques described herein. Process 700 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware in whole or in part. As explained above, some computing devices may have multiple memories and multiple processors, and the steps of process 700 may in such cases be distributed using different processors and memories.

For simplicity of explanation, process 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 702, process 700 begins decoding a frame of an encoded video bitstream by identifying a block of the frame to process. Generally, this begins by entropy coding the signal and then de-quantizing any quantized blocks as described above with respect to FIG. 5. At step 704, the prediction mode used to predict the current block can be identified by reading bits from a header associate with the block. Then, at step 706, the transform mode to inverse transform the block is identified by reading bits from a block header associated with the block. As described above in relation to FIG. 6, the transform mode can be identified by separate bits in a header associated with the block or can be implied by the prediction or realignment mode included in the encoded bitstream. At step 708, the block can be inverse transformed based on the transform mode. For example, and as described in relation to FIG. 6, a transform mode may be one or two series of 1D transforms, so the inverse transform is similarly applied. The output of inverse transform is a reconstructed residual block with re-aligned values based on the realignment mode used by the encoder for the block.

If at step 710 the block was predicted using an intra prediction mode, process 700 advances to step 712. At step 712, the realignment mode can be identified by reading bits from a header associated with the block. As discussed above, the realignment mode may be implied by the prediction mode read from a block header or may be indicated by separately included bits within the block header in the bitstream. At step 714, the inverse transformed block is re-aligned by process 700 to reset the pixels of the block back into the original positions that the pixels were in before being re-aligned by encoding. The output of this step is a reconstructed residual block.

Note that for certain intra prediction modes described above, i.e., vertical intra prediction, horizontal intra prediction or intra prediction modes that duplicate a single pixel value for all blocks of the predicted block, the realignment mode may be a null mode that does not realign the pixels in step 714.

At step 716, process 700 predicts the current block. For example, for a directional intra prediction mode, the decoder generates a prediction block using the particular intra prediction mode used for the current block, and then adds the prediction block to the inverse transformed, re-aligned pixels of the reconstructed residual block to form a decoded block corresponding to the original, input block. For other intra prediction modes, the generated prediction block is added to the inverse transformed pixels without realignment. When the prediction mode is other than an intra prediction mode in step 710, process 700 advances directly to step 716 to predict the current block using, e.g., inter prediction, by generating a prediction block and adding its pixels to the inverse transformed pixels without realignment. This decoded block is also called a reconstructed block.

After reconstructing the current block in step 716, process 700 tests to see if any further blocks remain to be decoded in step 718. If more blocks remain, process 700 loops back to step 702 to begin processing the next block or, if no blocks remain to be processed, process 700 ends.

By using the teachings herein, a transform for a given residual signal may be achieved in a simple way by permuting residual pixels based on a prediction mode of a block to be encoded. By doing so, many of the same benefits of directional transforms (e.g., directional DCT) may be achieved without unduly complicating existing transform, quantization and entropy coding processes and without adding significant processing time.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream having a plurality of frames, the method comprising:

identifying a prediction mode to be used to predict a first block of a frame of the plurality of frames;

generating a prediction block using the prediction mode;

generating, using a processor, a residual block as a difference between pixel values of the prediction block and the first block; and in response to determining that the prediction mode is a directional intra prediction mode that propagates values based on pixels peripheral to the first block in a diagonal direction to form the prediction block:

identifying a direction of propagation for the directional intra prediction mode;

realigning pixels of the residual block based on a realignment mode conforming to the directional intra prediction mode to form a realigned residual block by rearranging pixels located along the diagonal direction into at least one of rows or columns such that pixel dimensions of the realigned residual block are equal to pixel dimensions of the residual block and such that one of:

pixels of middle rows of the realigned residual block correspond to pixels of the residual block along the diagonal direction and pixels of a top-most row and a bottom-most row of the realigned residual block correspond to boundary pixels of the residual block; or pixels of middle columns of the realigned residual block correspond to pixels of the residual block along the diagonal direction and pixels of a right-most column and a left-most column of the realigned residual block correspond to boundary pixels of the residual block;

after realigning pixels of the residual block, transforming the realigned residual block using a transform mode to form a transformed realigned residual block; and encoding the transformed realigned residual block into an encoded video bitstream.

2. The method of claim 1, further comprising:

including bits within the encoded video bitstream identifying the prediction mode, the realignment mode and the transform mode.

3. The method of claim 1 wherein the prediction mode is one of a plurality of directional intra prediction modes, a horizontal intra prediction mode, a vertical intra prediction mode, an intra prediction mode that uses a common pixel value for all pixels of the prediction block or an inter prediction mode.

4. The method of claim 1 wherein realigning the pixels of the residual block comprises:

arranging the pixels of the residual block located in a scan direction offset from a direction of columns of the residual block and offset from a direction of rows of the residual block to form middle columns of the realigned residual block; and wherein a right-most column and a left-most column of the realigned residual block comprises the pixels on a boundary of the residual block.

5. The method of claim 1 wherein realigning the pixels of the residual block comprises:

arranging the pixels of the residual block located in a scan direction offset from a direction of columns of the residual block and offset from a direction of rows of the residual block to form rows of the realigned residual block; and wherein a top-most row and a bottom-most row of the realigned residual block comprises the pixels on a boundary of the residual block.

6. The method of claim 1 wherein transforming the realigned residual block further comprises:

performing a first series of 1D transforms in a first direction for each column of the realigned residual block or for each row of the realigned residual block followed by performing a second series of 1D transforms in a second direction using results of the first series of 1D transforms.

7. The method of claim 6 wherein each of the first series of 1D transforms is one of an asymmetric sine transform or a discrete cosine transform and each of the second series of 1D transforms is one of a discrete cosine transform or an asymmetric sine transform.

8. The method of claim 1, further comprising:

in response to determining that the prediction mode is other than a directional intra prediction mode:
transforming the residual block using a transform mode to form a transformed residual block; and
encoding the transformed residual block into the encoded video bitstream.

9. The method of claim 1, further comprising:

selecting the transform mode in accordance with the realignment mode.

10. The method of claim 9 wherein realigning pixels of the residual block based on a realignment mode conforming to the directional intra prediction mode to form a realigned residual block comprises arranging the pixels in a scan direction corresponding to the directional intra prediction mode into one of rows of the realigned residual block or columns of the realigned residual block, and wherein selecting the transform mode in accordance with the realignment mode comprises:

on condition that the pixels are arranged into the rows of the realigned residual block, performing a first series of 1D transforms on the rows of the realigned residual block and subsequently performing a second series of 1D transforms on the columns of the realigned residual block resulting from the first series of 1D transforms; and on condition that the pixels are arranged into the columns of the realigned residual block, performing a third series of 1D transforms on the columns of the realigned residual block and subsequently performing a second series of 1D transforms on the rows of the realigned residual block resulting from the first series of 1D transforms.

11. A method for decoding a video bitstream having a plurality of frames, the method comprising:

identifying, using a processor, a prediction mode that was used to predict a first block of a frame of the plurality of frames;

generating a prediction block using the prediction mode;

inverse transforming a first encoded block from the video bitstream using a transform mode to form an inverse transformed block;

in response to determining that the prediction mode is a directional intra prediction mode:
identifying a direction of propagation for the directional intra prediction mode;
after inverse transforming the first encoded block, realigning pixels of the inverse transformed block based on a realignment mode conforming to the directional intra prediction mode to form an unrealigned residual block by rearranging pixels located along the direction of propagation into at least one of rows or columns, wherein the first encoded block was encoded by an encoder that realigned pixels of a residual block resulting from prediction of the first block into a realigned residual block using the realignment mode before transforming the realigned residual block and that predicted the first block using the directional intra prediction mode to propagate into a prediction block used by the encoder in a diagonal direction values based on pixels peripheral to the first block, and pixel dimensions of the realigned residual block are equal to pixel dimensions of the residual block; and
adding pixels of the unrealigned residual block to the prediction block to reconstruct the first block; and in response to determining that the prediction mode is other than a directional intra prediction mode:
adding pixels of the inverse transformed block to the prediction block to reconstruct the first block without realigning the pixels of the inverse transformed block.

12. The method according to claim 11 wherein identifying the prediction mode comprises examining at least one bit in the video bitstream indicating the prediction mode, the method further comprising:

identifying the transform mode and the realignment mode based on the prediction mode.

13. An apparatus for encoding a video stream having a plurality of frames comprising:

a memory; and a processor configured to execute instructions stored in the memory to:

identify a prediction mode to be used to predict a first block of a frame of the plurality of frames;
generate a prediction block using the prediction mode;
generate a residual block as a difference between pixel values of the prediction block and the first block; and
in response to determining that the prediction mode is a directional intra prediction mode that propagates values based on pixels peripheral to the first block in a diagonal direction to form the prediction block:
realign pixels of the residual block based on a realignment mode conforming to the directional intra prediction mode to form a realigned residual block by rearranging pixels located along the diagonal direction into at least one of rows or columns such that pixel dimensions of the realigned residual block are equal to pixel dimensions of the residual block;
after the realigned residual block is formed, transform the realigned residual block using a transform mode to form a transformed realigned residual block; and
encode the transformed realigned residual block into an encoded video bitstream.

14. The apparatus of claim 13 wherein the directional intra prediction mode defines a scan order for the pixels of the residual block that is used to realign the pixels of the residual block, the scan order being offset from a direction of columns of the residual block and offset from a direction of rows of the residual block.

15. The apparatus of claim 13 wherein the prediction mode is one of a horizontal intra prediction mode or a vertical intra prediction mode and wherein the realignment mode is a null realignment mode such that the processor is configured to execute instructions to:
maintain the pixels of the residual block in a current position;
transform the residual block with the pixels in the current position to form a transformed residual block; and
encode the transformed residual block into the encoded video bitstream.

16. The apparatus of claim 13 wherein the processor is configured to realign pixels of the residual block based on a realignment mode conforming to the directional intra prediction mode to form a realigned residual block by:
arranging the pixels in a scan direction corresponding to the directional intra prediction mode into one of rows of the realigned residual block or columns of the realigned residual block;
and wherein the processor is configured to transform the realigned residual block by:
in response to arranging the pixels into the rows of the realigned residual block, performing a horizontal series of 1D transforms on the rows of the realigned residual block; or
in response to arranging the pixels into the columns of the realigned residual block, performing a vertical series of 1D transforms on the columns of the realigned residual block.

17. The apparatus of claim 16 wherein the processor is configured to:
perform a second series of 1D transforms on a result of performing the horizontal series of 1D transforms or performing the vertical series of 1D transforms as a first series of 1D transforms, the second series of 1D transforms being along a different direction from the first series of 1D transforms.

18. The apparatus of claim 13 wherein the transform mode is a 2D transform mode.

19. The apparatus of claim 13 wherein the processor is configured to realign the pixels of the residual block by one of:
arranging the pixels of the residual block located in a scan direction offset from a direction of columns of the residual block and offset from a direction of rows of the residual block to form rows of the realigned residual block; and wherein a top-most row and a bottom-most row of the realigned residual block comprises the pixels on a boundary of the residual block; or
arranging the pixels of the residual block located in a scan direction offset from a direction of columns of the residual block and offset from a direction of rows of the residual block to form columns of the realigned residual block; and wherein a left-most column and a right-most column of the realigned residual block comprises the pixels on a boundary of the residual block.

20. The apparatus of claim 19 wherein the processor is configured to select the transform mode based on whether the pixels are arranged to form the columns or the rows of the realigned residual block.

* * * * *